Patented May 8, 1934

1,957,429

UNITED STATES PATENT OFFICE 1,957,429

INSECTICIDE AND INSECTIFUGE

Elmer Wade Adams, Hammond, Ind., assignor to Standard Oil Company, Chicago, Ill., a corporation of Indiana No Drawing. Application May 4, 1931, Serial No. 535,072

9 Claims. (Cl. 167—24)

This invention relates to insecticides and insectifuges and particularly to a composition that exhibits insecticidal and insectifugal properties.

The object of this invention is to produce a composition of matter that is non-injurious to domestic animals but produces a pronounced toxic and repellent effect upon insect pests. A further object is to produce a composition of matter which comprises an ingredient that produces a quick paralyzing effect upon insects and other ingredients that supply the necessary lethal toxicity.

My new composition comprises a mixture of dialkyl phthalates and the oil soluble extract obtained from pyrethrum flowers. The above substances are dissolved in a suitable vehicle capable of being sprayed upon animals. The vehicle employed is usually the oil used in extracting the pyrethrum flowers. When spraying upon domestic animals, such as cows or horses, it will provide substantially complete freedom from flies and insect pests, and at the same time kill most of the insects affected.

The process for making the preferred composition may be fully understood from the following description of an illustrative embodiment thereof:

Example

The pyrethrum extract solution is prepared by adding 200 gallons of pale mineral oil (viscosity from 80 to 85 seconds Saybolt at 100° F.) at 125° F. to 100 pounds of pyrethrum flowers. The pyrethrum flowers are allowed to soak in the oil at room temperature from five to ten days. The mass is stirred at intervals to prevent stratification of the oil and flowers. After the soaking is completed, the oil is drained or filtered from the pyrethrum flowers and is ready to be mixed with a small quantity of dialkyl phthalates. To this solution is added 2% by volume of di-n-butyl phthalate.

Other pale mineral oils having a viscosity between 50 and 100 seconds Saybolt may be used to prepare the pyrethrum extract solution, or used as a vehicle for the pyrethrum extract and dialkyl phthalates. Also ketones, alcohols and other organic solvents may be used to prepare the pyrethrum extract. For example, acetone, ethyl alcohol and isopropyl alcohol are useful organic solvents. Also various proportions of phthalates and dialkyl phthalates, up to 6 percent by volume, may be used without departing from the scope of the invention. Phthalates of the general formula

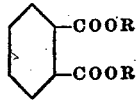

R represents an alkyl group. Specific examples of this ester are diethyl, dibutyl and diamyl phthalate.

may be used to prepare my new composition. Also, isophthalates and terephthalates may be used instead of orthophthalates.

The following table shows the results obtained from comparative tests made on the new composition and the various ingredients contained in the composition. The tests were performed by spraying equal quantities of the material to be tested into a cubic yard container and then introducing one hundred flies. The flies were exposed for fifteen minutes and then removed to fresh air for one hour. The percentage of flies knocked down in ten minutes was recorded for the purpose of showing the relative knockdown or paralyzing effect of the materials.

| Substances | Percentage of flies down in | | Percentage of flies unaffected after exposure to fresh air for one hour |
|---|---|---|---|
| | 10 mins. | 15 mins. | |
| 1. 100% dibutyl phthalate | 100 | 100 | 33 |
| 2. The oil extract solution obtained by extracting 100 pounds of pyrethrum flowers with 200 gallons of pale oil. (See example.) | 80 | 92 | 15 |
| 3. Pyrethrum extract solution with 2% of di-n-butyl phthalate. (See example.) | 100 | 100 | 2 |

It will be observed from the above table that the phthalates act as a knock-down or paralyzing agent, but when the flies are exposed to fresh air a large percentage will recover. Also, the pyrethrum extract solution does not kill a large percentage of flies affected. By combining a small quantity of the phthalates with the pyrethrum extract, as shown in item 3 of the above table, I can produce an insecticide that will kill substantially all of the flies affected. The result is explainable on the theory that the phthalates very quickly weaken the insects and knock them to the floor, thereby enabling and assisting the active ingredients of the pyrethrum flowers to produce their lethal toxic effect.

A solution of mineral oil and small quantities of dialkyl phthalates is unsatisfactory for producing a toxic effect upon insect pests.

It should be appreciated that by combining a small amount of dialkyl phthalates, an insect repellant, with pyrethrum extract, I can produce a composition of matter that exhibits excellent toxic properties and does not produce dermatitis.

Various changes may be made in the proportion and strength of solutions used without departing from the spirit of the invention as described herein.

I claim:

1. A new composition of matter, comprising pyrethrum flower extract and an alkyl phthalate.

2. An insecticide and insectifuge, comprising the oil soluble extract from pyrethrum flowers and a dialkyl phthalate dissolved in a pale mineral oil.

3. An insecticide and insectifuge, comprising the oil extract solution from pyrethrum flowers and a small proportion of a dialkyl phthalate of the following formula:

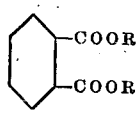

R represents an alkyl group containing from one to five carbon atoms.

4. An insecticide and insectifuge, comprising the oil soluble extract from pyrethrum flowers and a small proportion of di-n-butyl phthalate.

5. An insecticide and insectifuge, comprising the oil soluble extract from pyrethrum flowers and a small proportion of dibutyl phthalate dissolved in a mineral oil.

6. An insecticide and insectifuge, comprising the oil soluble extract from pyrethrum flowers and a small proportion of a dibutyl phthalate dissolved in a mineral oil having a viscosity from 80–85 seconds Saybolt.

7. The process of increasing the paralytic properties of pyrethrum extract solutions which comprises adding not over 6 percent. by volume of dialkyl phthalates.

8. An insecticide and insectifuge, comprising the oil soluble extract from pyrethrum flowers and diethyl phthalate.

9. An insecticide and insectifuge, comprising an oil soluble extract from pyrethrum flowers and diamyl phthalate.

ELMER WADE ADAMS.